United States Patent [19]

Bailey et al.

[11] Patent Number: 4,588,887
[45] Date of Patent: May 13, 1986

[54] RESONANT GALVANOMETER SCANNER ASSEMBLY

[75] Inventors: David C. Bailey, Cocoa Beach; Lee M. Burberry, West Melbourne, both of Fla.

[73] Assignee: Harris Corporation, Melbourne, Fla.

[21] Appl. No.: 527,359

[22] Filed: Aug. 29, 1983

[51] Int. Cl.$^4$ .............................................. G02B 26/10
[52] U.S. Cl. ..................... 250/236; 250/239; 350/6.6; 350/6.91; 358/285
[58] Field of Search ............... 250/234, 235, 236, 239; 350/6.1, 6.5–6.91; 358/285, 293

[56] References Cited

U.S. PATENT DOCUMENTS

| | | | |
|---|---|---|---|
| 4,329,011 | 5/1982 | Mori et al. | 250/236 |
| 4,350,988 | 9/1982 | Masegi | 358/285 |
| 4,449,046 | 5/1984 | Zuckerman et al. | 250/235 |

*Primary Examiner*—Edward P. Westin
*Attorney, Agent, or Firm*—Antonelli, Terry & Wands

[57] ABSTRACT

A hardware packaging assembly for a galvanometer optical beam scanning apparatus includes an optical component-containing portion having a light source aperture through which the output beam from the ILD that carries the to be recorded data passes. This aperture is disposed in a wall defining a boundary of the interior of the housing. Light from the ILD is reflected off a fixed mirror disposed adjacent to an opposite wall and is directed to a galvanometer scanning mirror. As the mirror is rotated about a longitudinal axis, it scans the ILD output beam across an output (image correction) lens mounted in the housing. A second opening disposed in the rear wall of the housing interior receives a start-of-scan photodetector element, which is positioned to detect light that is back-reflected off the inner face of the lens at a prescribed angle of sweep of the beam by the galvanometer mirror.

19 Claims, 4 Drawing Figures

RESONANT GALVANOMETER SCANNER ASSEMBLY

FIELD OF THE INVENTION

The present invention relates to light beam scanning apparatus for periodically sweeping a beam of light across an object, and particularly to an improved packaging assembly for housing the optical and signal processing components of the scanning apparatus.

BACKGROUND OF THE INVENTION

Optical scanning systems, such as those used for facsimile recording, commonly employ a periodic scanning mechanism, such as a galvanometer beam sweep device, through which a modulated beam of light (e.g. from an injection laser diode (ILD) source) is directed toward and swept across an object of interest, (e.g. a recording medium). During the recording operation, the beginning of a sweep interval must be accurately located in order to assure system synchronization and alignment of successive traces of the swept recording beam. This is usually accomplished through the use of a start (or end) of sweep photodetector and a dedicated deflection mirror disposed at a preselected end of sweep point of travel of the beam. As the beam is swept periodically across a field of view, it is intercepted by the dedicated deflection mirror at a prescribed point of its travel and the deflected beam is directed onto the photodetector, from which an end of (start of) sweep signal is coupled to the signal processing electronics. For exemplary illustrations of the use of such an end of sweep detection arrangement in an optical scanning system, attention may be directed to the U.S. Pat. Nos. to Hosterman et al 3,692,414, Fleischer 3,750,189, Erdman et al 3,809,891 and Sato 4,214,154.

Unfortunately, the types of mechanisms described in the above-referenced patent literature introduce or add complexity to the overall scanning and signal processing components as they require the use of additional hardware in the recording apparatus housing. In addition, the recording apparatus themselves are often cumbersome mechanical units and thereby do not lend themselves to present day needs of system compactness and simplicity.

SUMMARY OF THE INVENTION

In accordance with the present invention, there is provided a new and improved hardware assembly for a galvanometer optical beam scanning apparatus, which has a compact configuration and achieves a number of required functions through a simplified packaging scheme. Basically this scheme involves the use of the back-reflection and converging-focus properties of an image correction lens, together with the physical arrangement of the components, to achieve a highly compact and low cost scanner configuration.

The optical component-containing portion of this housing assembly includes a light source aperture through which the output beam from the ILD that carries the to be recorded data passes. This aperture is disposed in a wall defining a boundary of the interior of the housing. Light from the ILD is reflected off a fixed mirror and is directed to a galvanometer scanning mirror. As the mirror is rotated about a longitudinal axis, it scans the ILD output beam across an output (image correction) lens mounted in an aperture provided in a wall of the housing. A second opening disposed in a housing wall receives a start-of-scan photodetector element, which is positioned to detect light that is back-reflected off the inner face of the lens at a prescribed angle of sweep of the beam by the galvanometer mirror.

In addition to the light beam source (ILD) and start of scan photodetector, the remainder of the signal processing components of the facsimile recorder may be arranged adjacent to but exterior of the optical component portion of the assembly to thereby provide an extremely compact arrangement.

DETAILED DESCRIPTION

Figure 1:
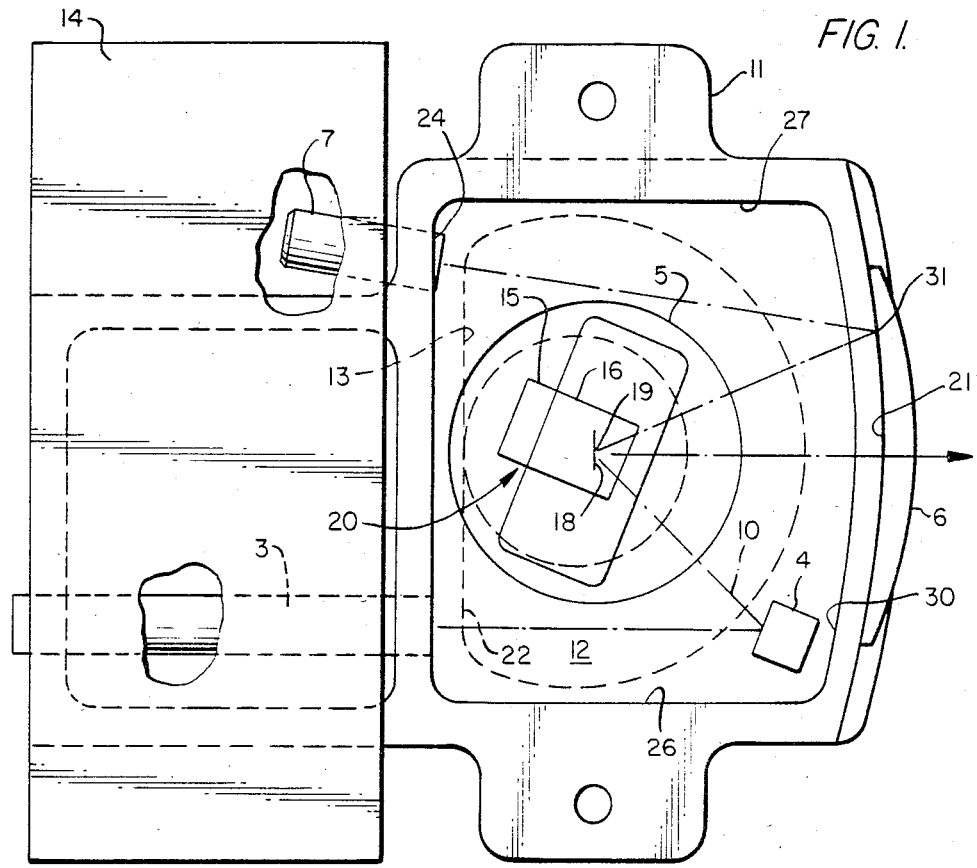
FIG. 1 is a schematic top view of the galvanometer scanner housing assembly according to a first embodiment of the present invention.
Figure 2:
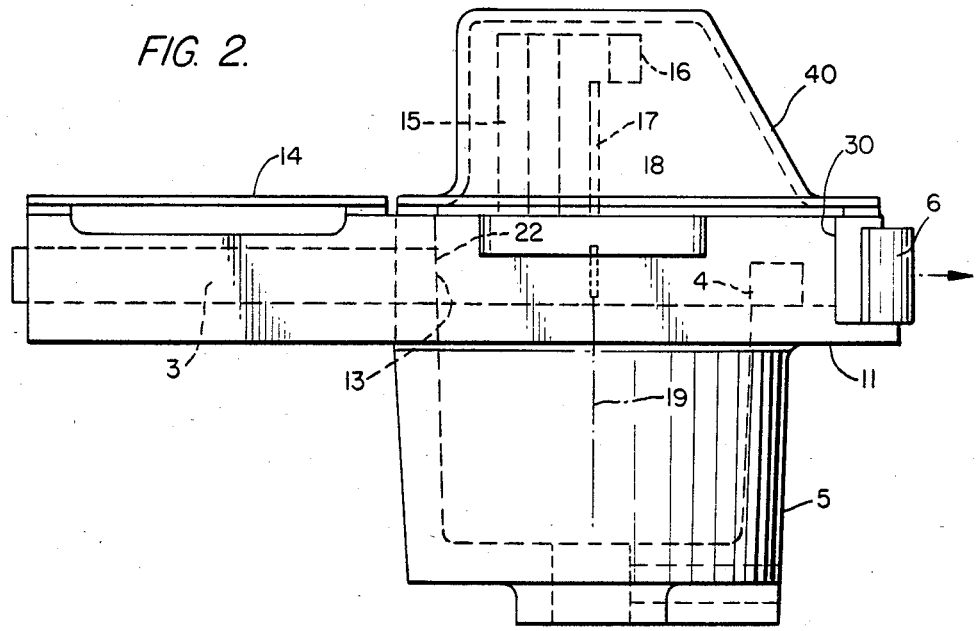
FIG. 2 is a schematic side view of the galvanometer scanning housing assembly according to the first embodiment of the present invention.
Figure 3:
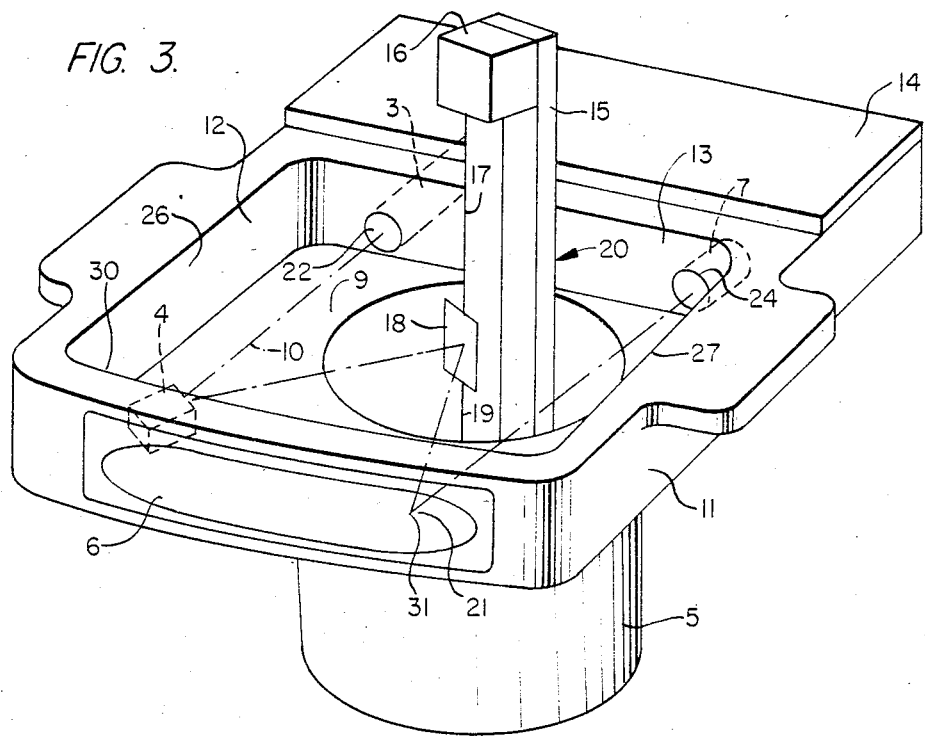
FIG. 3 is a pictorial schematic view of the galvanometer housing scanning assembly according to the first embodiment of the present invention.

With reference now to FIGS. 1-3 of the drawings, which show a first embodiment of the housing assembly of the present invention in respective top, side and pictorial views, the assembly comprises essentially an optical component-containing interior portion 12 and an adjacent processing electronics-containing portion 14. The interior of housing 11 is defined by spaced apart rear wall 13, front wall 30, and side walls 26 and 27. In one side of rear wall 13 is an aperture 22 that is coupled to a light source assembly 3, such as an injection laser diode assembly (ILD), to which the signal processing circuitry of the processing electronics 14 are connected on the electronics board. An example of the data modulation and control circuitry with which the housing assembly of the present invention may be employed is described in copending patent application Ser. No. 413,418 filed Aug. 30, 1982, now U.S. Pat. No. 4,482,902 issued Nov. 13, 1984, entitled "Resonant Galvanometer Scanner System Employing Precision Linear Pixel Generation" by D. C. Bailey et al, and assigned to the Assignee of the present application.

In a facsimile recorder apparatus a start (or end) of scan detector is normally employed for synchronization and trace accuracy repeatability purposes. In the housing assembly of the present embodiment, the start of scan detector is provided on the processing board 14 adjacent an aperture 24 and the rear wall 13 of the housing. The start of scan detector 7 is coupled as part of the processing electronics 14 and is positioned to face the interior face 21 of a lens 6 which is provided in an aperture provided in the front wall 30 of the housing. The beam path 10 from the laser diode source 3 extends through the aperture 22 in the rear wall 13 towards the front wall 30 of the housing and is intercepted by a stationary reflection mirror 4 that is affixed to a cube supported on the bottom 9 of the interior portion 12 of the housing 11. Beam 10 is reflected off mirror 4 and is then intercepted by a rotatably driven mirror 18 of a galvanometer deflection subassembly shown generally at 20. Galvanometer deflection subassembly 20 may be a commercially available unit manufactured by General Scanning Incorporated, Watertown, Massachussetts and includes a galvanometer sweep mirror 18 supported by a bar 17 which extends vertically from a rotation post mounting block 16 that is mounted to a galvanometer support post 15. Galvanometer support post 15 is rotatably swept about an axis 19 by a galvanometer drive motor 5 which causes mirror 18 to scan beam 10 back and forth across field correction lens 6. At a prescribed location of incidence 31 of beam 10 on the interior face 21 of lens 6, the beam 10 is partially reflected off the interior face 21 of lens 6 and due to the curved surface of face 21, is effectively concentrated or focussed through aperture 24 and onto the start-of-scan photodetector 7, to provide a transient photosignal input to the photodetector. During other positions of rotation of the galvanometer mirror 18, beam 10 is not intercepted by photodetector 7.

With the housing configuration shown in FIGS. 1-3, a very compact, yet highly functional housing assembly is provided. All of the electronics components are compactly fitted in a common mounting arrangement immediately adjacent to and coupled through the rear wall 13 of the optics section of the housing. Still, the light beam source (ILD) 3 and the start of scan photodetector 7 may be placed at opposite sides of the electronics processing board and physically separated from one another sufficiently to prevent erroneous optical coupling therebetween, so that start of scan photodetector 7 generates an output signal only when the path of beam 10 is properly directed by galvanometer scanning mirror 18 in the manner shown in the drawings and described above. Advantageously, within unit 20 the galvanometer sweep components are disposed along the galvanometer sweep axis 19 thereby providing an optical free sweep path for the beam 10 within the interior of the housing, so that advantage may be taken of the fact that the interior face 21 of the correction lens 6 may be used to reflect part of the beam at the start of sweep. Because of the concave properties of lens 6, beam 10 is focussed when directed towards photodetector 7 to provide a sharp signal spike at the photodetector output at the start of sweep. This start of sweep signal is thereby readily distinguishable by the processing electronics.

Figure 4:
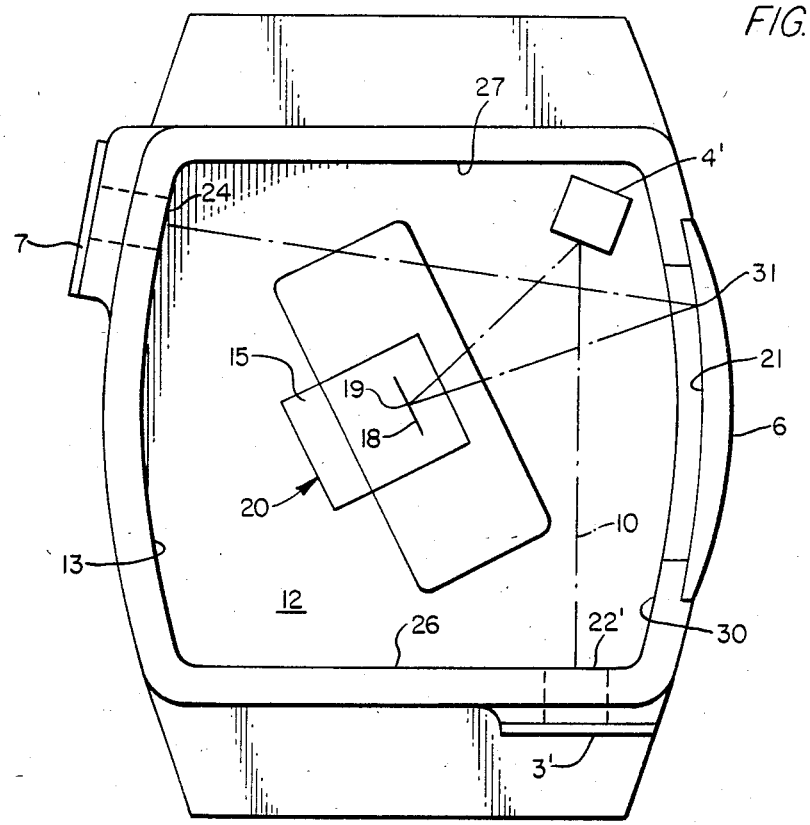
FIG. 4 is a schematic top view of the scanner housing assesmbly according to a second embodiment of the present invention.

In the embodiment of the invention described above and shown in FIGS. 1-3, both the injection laser diode can (the light beam source 3) and the end of scan photodetector 7 are coupled with the rear wall 13 of the housing adjacent to which the signal processing electronics board 14 is provided. Other physical configurations are possible, however, one such arrangement being shown in FIG. 4. In this embodiment, the light beam source 3' is coupled with an aperture 22' provided in side wall 26, adjacent to front wall 30. Fixed mirror cube 4' is disposed adjacent to the interior corner of the intersection of side wall 27 and front wall 30, so that it is opposite aperture 22', but spaced out of the way of beam path 10 when reflected off point 31 on the inner face 21 of lens 6 and onto photodetector 7. The substantially clutter free environment of the interior of the housing is still provided, yet easy access to the light beam source 3' and photodetector 7 is afforded.

Because of the substantially component clutter free environment of the interior of the housing, access thereto and the optical components of the system therewithin is facilitated simply by the removal of cover 40. The galvanometer drive, on the other hand, is accessible through the lower portion of the assembly without interfering with the established optical path of the fixed optical components. This permits replacement or modification of the galvanometer mirror simply by dropping the drive unit and the support post components attached thereto from the central interior portion of the housing. Because the electro-optic and signal processing components are contained within a common processing electronics package 14, as in the first embodiment of the invention and externally mounted as in the second embodiment, they may be serviced separately without impacting the physical-optical integrity of the reflection/scanning components in the interior of the housing.

While we have shown and described a several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. An optical scanner housing assembly comprising: a housing having an interior portion defined by respective wall portions thereof, and having therein a first aperture through which a beam of light is to be directed, a second aperture spaced apart from said first aperture, and a third aperture for receiving a lens; and means, disposed within said interior portion of said housing, for scanning across said third aperture a beam of light directed through said first aperture, such that, for a prescribed point of the scanning of said beam, a portion of said beam is caused to be reflected off the interior face of said lens and directed through said second aperture to a photodetector coupled therewith.

2. An assembly according to claim 1, wherein said first and second apertures are spaced apart from one another in a first wall portion of said housing so that said first and second apertures face said third aperture in a second wall portion of said housing.

3. An assembly according to claim 2, wherein said scanning means comprises a galvanometer scanning mechanism having a rotatable mirror for scanning said beam, directed thereto from said first aperture, across said lens, so that part of said beam is reflected off said lens and becomes incident on said second aperture.

4. An assembly according to claim 3, wherein in said photodetector is coupled with said second aperture for detecting a prescribed extent of travel of scan of said beam across said lens.

5. An assembly according to claim 4, wherein said first and second apertures are provided at opposite ends of said first wall portion.

6. An assembly according to claim 1, wherein said first aperture is provided in a first wall porion, said second aperture is provided in a second wall portion, and said third aperture is provided in a third wall portion of said housing.

7. An assembly according to claim 2, wherein said first and second wall portions and said first and third apertures face one another, respectively.

8. An assembly according to claim 6, wherein said scanning means comprises a galvanometer scanning mechanism having a rotatable mirror for scanning said beam, directed thereto from said first aperture, across said lens, so that part of said beam is reflected off said lens and becomes incident on said second aperture.

9. An assembly according to claim 8, wherein said photodetector is coupled with said second aperture for detecting a prescribed extent of travel of scan of said beam across said lens.

10. An assembly according to claim 8, wherein said first and second wall portions and said first and third apertures face one another, respectively.

11. For use with a facsimile recording apparatus wherein an optical information beam is caused to scan a prescribed field of view and detection means are provided to detect a prescribed point in the scan of said beam across said field of view, a housing assembly for supporting optical scanning components of said apparatus comprising:

a housing having an interior portion defined by rear and front walls and a pair of side walls therebetween, said rear wall having a first opening through which said optical information beam is directed and a second opening for providing optical coupling to said detection means, and said front wall having a third opening for receiving a focussing lens; and a galvanometer scanner mechanism coupled with the interior of said housing and having a rotatable reflecting surface for scanning said optical information beam across said focussing lens, such that at a prescribed point of the scanning of said beam, a portion of said beam is caused to be reflected off an interior face portion of said lens and directed through said second opening to said detection means.

12. An assembly according to claim 11, wherein said first and second openings are provided at opposite ends of said rear wall.

13. An assembly according to claim 12, wherein said housing is adapted to be coupled with a signal processing unit containing a source of said optical information beam and said detection means at a location adjacent said rear wall thereof.

14. For use with a facsimile recording apparatus wherein an optical information beam is caused to scan a prescribed field of view and detection means are provided to detect a preselected point in the scan of said beam across said field of view, a housing assembly for supporting optical scanning components of said apparatus comprising:

a housing having an interior portion defined by rear and front walls and a pair of side walls therebetween, one of said walls having a first opening through which said optical information beam is directed, one of said walls having a second opening for providing optical coupling to said detection means, and one of said walls having a third opening for receiving a focussing lens; and a galvanometer scanner mechanism coupled with the interior of said housing and having a rotatable reflecting surface for scanning said optical information beam across said focussing lens, such that at a prescribed point of the scanning of said beam, a portion of said beam is caused to be reflected off an interior face portion of said lens and directed through said second opening to said detection means.

15. An assembly according to claim 14, wherein said first opening is provided in one of said side walls and said second opening is provided in said rear wall.

16. An assembly according to claim 15, wherein said third opening is provided in said front wall.

17. An assembly according to claim 14, wherein said first and second openings are provided in said rear wall and said third opening is provided in said front wall.

18. An assembly according to claim 14, wherein said first opening is provided in a side wall and said third opening is provided in said front wall.

19. An assembly according to claim 14, wherein said first opening is provided in said rear wall and said third opening is provided in said front wall.

* * * * *